United States Patent [19]

Miles

[11] Patent Number: 4,949,180
[45] Date of Patent: Aug. 14, 1990

[54] VIDEO IMAGE PROCESSING SYSTEMS

[75] Inventor: Barry D. R. Miles, Newbury, Great Britain

[73] Assignee: Quantel Limited, Newbury, England

[21] Appl. No.: 253,395

[22] Filed: Oct. 3, 1988

Related U.S. Application Data

[63] Continuation of Ser. No. 926,451, Nov. 3, 1986, abandoned.

[51] Int. Cl.⁵ .............................................. H04N 1/23
[52] U.S. Cl. ..................................... 358/183; 358/22; 340/723; 364/521
[58] Field of Search ................... 358/183, 22, 80, 160, 358/166; 364/521, 522, 523; 340/723, 703

[56] References Cited

U.S. PATENT DOCUMENTS

| | | | |
|---|---|---|---|
| 4,514,818 | 4/1985 | Walker | 364/521 |
| 4,577,219 | 3/1986 | Klie | 358/80 |
| 4,633,416 | 12/1986 | Walker | 364/521 |

FOREIGN PATENT DOCUMENTS

| | | |
|---|---|---|
| 0079661 | 5/1983 | European Pat. Off. . |
| 2113950 | 8/1983 | United Kingdom . |
| 2140257 | 11/1984 | United Kingdom . |

*Primary Examiner*—Tommy P. Chin
*Attorney, Agent, or Firm*—Cooper & Dunham

[57] ABSTRACT

A processing circuit which is arranged to operate in three modes. The first mode is to act as a brush processor in video graphics creation combining incoming video signals with stored video signals to produce a graphic signal. The second mode allows an image to be composed from two or more input pictures using stencil signals. The third mode is useful in still picture applications where one frame is to be viewed and the next previewed. Stencil signals allow the operator to cut or fade from one frame to the other.

21 Claims, 3 Drawing Sheets

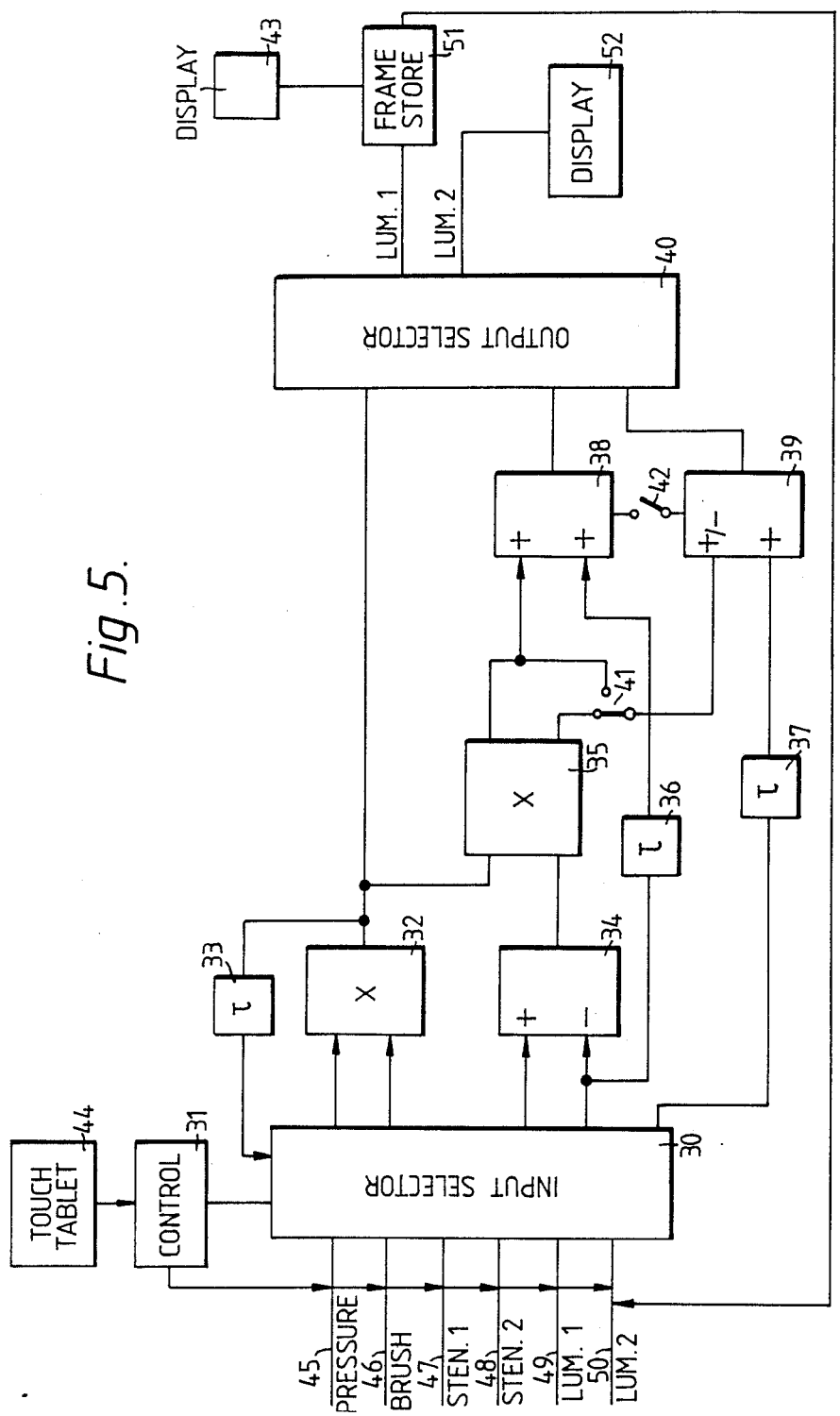

VIDEO IMAGE PROCESSING SYSTEMS

This is a continuation of application Ser. No. 926,451, filed Nov. 3, 1986 now abandoned.

BACKGROUND TO THE INVENTION

This invention relates to improvements in video image processing systems particularly those which include the combination of two or more incoming video signals under the control of a control signal.

Three prior art systems for this type of processing are shown in FIGS. 1-3. Although the processing is carried out in a similar manner by all three the inputs and outputs of each system are different.

In video graphics equipment there are two requirements that can be met by this type of processor, the need to produce new images under operator control to give the effect of painting and to combine signals from two or more sources of image signals so that the output image can contain areas of image signals from one or all the sources. The circuit shown in FIG. 1 is a so-called brush processor, described in Ser. No. 326,293 (which is incorporated herein by reference), used in Quantel's video graphic system to create new images. In this system the image is produced by combining new video signals representing luminance or chrominance with signals stored in a framestore in proportions determined by a control signal K. The luminance and chrominance signals to be used are chosen by the operator as is also the notional artists implement to be used in the creation. Command signals can be input to the system by the operator by the use of a stylus and touch tablet to identify image points at which 'paint' is to be 'applied'. The control signal K for each identified image point is produced at the output of multiplier 2 in FIG. 1 and results from the multiplication of first a brush signal, which is a signal relating to the distribution power of the notional implement chosen by the operator, second a signal relating to the pressure applied by the operator to the stylus and third a stencil signal. The operation of a stencil in this system is analogous to that in the conventional artists equipment. Where the operator has not chosen to use a stencil this signal will be set to 1 and so K will be simply brush signal times pressure. K will always be a value between 0 and 1. The processing is done picture point by picture point but K may be pre-calculated for each picture point as described in co-pending U.S. application Ser. No. 851,110, however this will not effect the operation of this circuit.

Referring only to luminance signals, although similar processing is applied to chrominance signals, the output is produced by multiplying the incoming luminance chosen by the operator by K in multiplier 3 and adding this to the luminance times 1−K in 5. The luminance applied to 5 is the luminance generated for the particular picture point from previous operations of the system. It will be obvious that the output is then K L in +(1−K) L store, where L in is the incoming luminance and L store is the luminance stored at that point. It is found that this processing gives a very realistic image.

FIG. 2 shows a processor which can combine two picture sources in a way which produces an output image which contains different areas of each image as described in U.S. application Ser. No. 457,098 (which is incorporated herein by reference). Where one image is moved relative to the second, parts of the that image may be made to appear as they move in front of objects in the stationary image. Each picture source is provided with a stencil signal which consists of signals for each picture point having a value between 0 and 1 and these signals are multiplied together to provide a control signal k at the output of multiplier 7. The control signal k is again a digital signal with a value between 0 and 1 and is used to determine the proportions in which the two picture signals are combined. It is to be understood that in this system also separate processing paths will be provided for luminance and chrominance signals. In this system, means are provided for displacing one set of the picture signals, and the corresponding stencil signals, relative to the other set, and for allowing part of one image to be moved around a second image by the operator until the correct position is found when the composite image can then be processed to be part of the final image.

The output from adder 11 in FIG. 2 is kP1+(1−k) P2 where P1 is a signal from the first picture source and P2 is a signal from the second picture source. The circuit components needed to achieve this are the same components as in 2 to 6 FIG. 1 arrangement but the circuits are not usually combined. By calculating the stencil signals for each picture source it can be provided that where those areas in picture 1 are to appear on the output image k will be large and vice versa, where picture 2 is to appear. Additional circuitry is of course provided to produce the addressing and to move one picture relative to the second.

The prior art system shown in FIG. 3 is a processor used in still store systems which may be part of a video graphics system. In these systems one facility that is desirable is to be able to view the contents of one store and at the same time preview the contents of a second store and to be able to cut or fade from one to the other. The control value K in the processing in this case can be used then to achieve fade by gradually changing from 1 to 0 or cut by changing more abruptly. Two still pictures are stored in framestores 12 and 13 and then output to the multipliers 14–17. The factor K is applied as a second input to multipliers 15 and 16 and 1−K to multiplier 14 and 17 and it will be obvious from FIG. 3 that the main output from 20 consists of KP2 +(1−K) P1, and the preview output from 19 consists of KP1, +(1−K) P2. As K changes from 0 to 1 then the image stored in framestore 12 will disappear at the main output from 20 and reappear at the preview output from 19. All three circuits described operate on a point by point basis and with suitable additional components can provide a displayed image.

Although the components used in these prior art systems are well known, the implementation of these processors in hardware can be very costly. The processor for the still store is rather more expensive than the other two because of the large number of multipliers involved.

SUMMARY OF THE INVENTION

The aim of the present invention is to provide a means for carrying out these three types of processing which is less expensive in terms of components.

According to the invention there is provided, a video processing circuit comprising:
(a) at least two sources of video signals representing different pictures;
(b) a source of signals representing brush shape;
(c) a video graphic means including a stylus device for producing a control signal which is a function of said brush shape signals and pressure on said stylus;

(d) a source of graphic signals for points on a picture designated by said stylus device;

(e) a source of stencil signals;

(f) framestore means having a writing input and a reading output;

(g) a processing circuit having two video inputs for two video signals $L_1$ and $L_2$ and a control input for a control signal K and arranged to produce output signals representing $K L_1+(1-K) L_2$;

(h) selector means for conditioning the system to operate selectively in any one of a plurality of different modes including;

(1) a mode having said source of graphics video signals connected to one video input of said processing circuit, said output of said framestore connected to the second video input of said processing circuit, the output of said processing circuit being written into said framestore, said control signal of said video graphic means connected to said control input of said processing circuit, and (2) a second mode having said two sources of video signals connected to said two video inputs of said processing circuits, said control input of said processing circuit connected to said source of stencil signals.

Further according to the present invention there is provided a video processing system comprising, input means for video signals from a plurality of sources, input means for a plurality of control signals, selector means for selecting video signals from more than one source and for selecting one or more control signals, combining means for combining said selected control signals to produce a combined control signal, processing means for combining the selected video signals in proportions determined by said combined control signal, said processing means being capable of operating in more than one mode, one mode producing one video output which is the combination of two or more input signals, and the second mode producing two video outputs with one output being the input signals combined in the reverse proportions to the combination of the signals in the other output, and means for selecting the mode of operation of the processing means.

BRIEF DESCRIPTION OF THE DRAWINGS

One embodiment of the invention will now be described with reference to the following diagrams.

FIG. 5 shows a second embodiment of the invention.

DETAILED DESCRIPTION OF THE INVENTION

Figure 1:
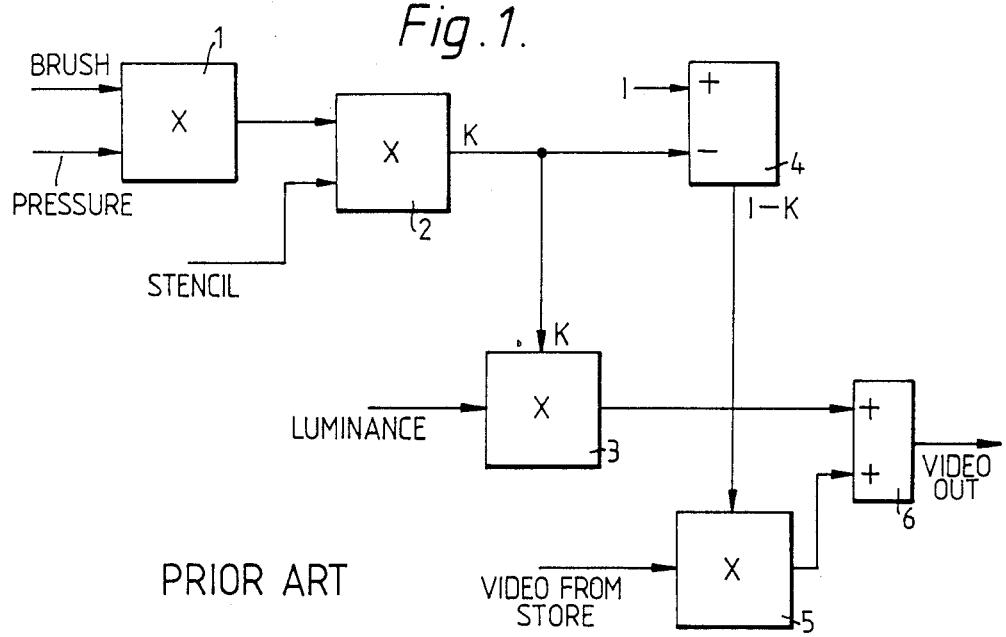
FIG. 1 shows a prior art brush processor.
Figure 2:
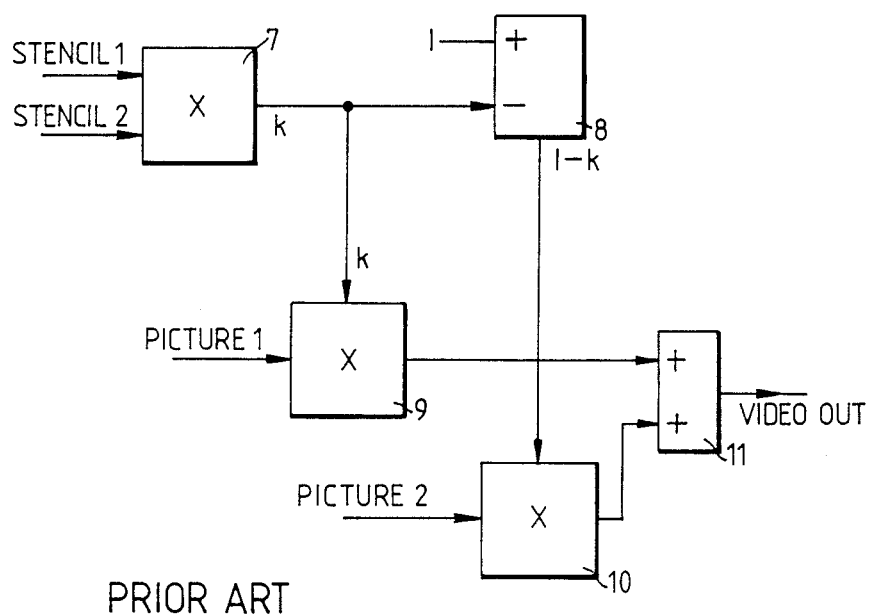
FIG. 2 shows a prior art combiner.

Reference first to FIG. 5, the processor shown in this figure is capable of achieving all the results produced by the three prior art circuits described above with what can be seen as a considerable saving in components. The input selector 30 selects any of a number of control signals and video signal inputs the selection being dependent on the mode in which the circuit is to operate. The operation of the circuit will now be described for each of the three processes mentioned previously but referring to luminance signals only.

When the circuit is to operate as a brush processor for video graphics systems the operator provides signals via the control 31 which cause input selector 30 to select luminance from the framestore 51 as the luminance 2 (L2) (50) input and new luminance (49) as luminance 1 (L1) input and also selects brush signals which represent graphic parameters of chosen implements, a pressure signal and a stencil signal as the control signals. The operator of the video graphics system causes the image to be generated by 'drawing on a touch tablet with a pressure sensitive stylus'. In order to combine the control signals, values of brush (46) and pressure signals (45) for a pixel of the image are input to multiplier 32 before that pixel is present on the input to the processor and the output of multiplier 32 is delayed in delay 33 until the corresponding pixel arrives. The product of brush (46) and pressure (45) is then reapplied to the multiplier 32 with the stencil 1 signal, to form a second product. Luminance values L1 and L2 are presented to the subtractor 34 at this time and the difference L1−L2 is applied to the multiplier 35 to be multiplied by the said second product of brush (46), pressure (45) and stencil 1. It will be understood that where there is no stencil signal and if the pressure signal and the brush are combined before being input to the processor, the brush signal and pressure signals may simply be input at the same time as the luminance signals. The output from multiplier 32 is the control signal K used in the processing and is, say, an 8 bit digital signal representing a number between 0 and 1. The incoming luminance signals are also 8 bit digital signals. Subtractor 34 provides as an output (L1−L2) and this is applied to multiplier 35 as one input while the second input is the K signal. The output of this multiplier is K(L1−L2) and the most significant bits of these output bits pass to adder 38 whilst the remaining pass via switch 41 to component 39 which in this case acts as an adder. Adder 38 receives as a second input the luminance L2 from the store L2 delayed in delay 36, and the output from the adder is $KL1+(1-K) L2$ which is the new picture point and this can be stored in the framestore 51 at the correct address and can also be viewed on a display 43. The second adder 39 is provided for the reminder because if K is very small information will be lost if only the first 8 bits are used. For the first pass the second input to the adder will be zero and after that will be the output of adder 39. When the value has accumulated beyond the eight bits in this output switch 42 operates to increase the output produced in adder 38 by the correct amount. This is a well known technique for these types of system.

When the circuit of FIG. 5 operates as a brush processor, i.e., in a brush mode, the following labels can be used:

"P" for the input at 45, which is a signal representing pressure which the operator applies to an implement such as a stylus on a tablet;

"B" for the input at 46, which is a signal representing a selected brush shape;

"S" for the input at 47, which is a stencil signal;

"K(brush)" for the output of multiplier 32, which uses the signals labelled P, B and S to derive and output the control signal K, which in this mode (brush mode), is labelled K(brush);

"Ls" for the input at 50, which is the pixel values stored in the framestore and derived therefrom by the processor, which pixel values s are supplied to the negative input of subtractor 34;

"Ln" for the input at 49, which is new pixel values to be supplies to the positive input of subtractor 34; and "Lc" for the output of adder 38, which is combined pixel values derived by combining the pixel values Ls and Ln in multiplier 35 and adder 38 in accordance with the control signal K(brush).

It will be obvious that the operation of the circuit is much the same as described above when two images are to be combined. In this case the inputs are luminance signals representing two images $P_1$ and $P_2$ (at 49 and 50, respectively) and the control signals are the stencil signals (47, 48) corresponding to those images. The images to be combined may in fact have been produced by a video graphics system in the way described above and the stencils could also have been produced in a graphics system. The two stencil signals are multiplied in multiplier 32 to give the control signal K which can be selected by the output selector 40 to form the stencil signal for the resultant image as well as being applied to multiplier 35. The output image (in which a pixel has the value $KP_1+(1-K)P_2$ may be viewed on a display 43. The facility for using the remainder of the output of 35 is not required in this processing.

When the circuit of FIG. 5 operates to combine two images, i.e., in a picture blend mode, the following labels can be used:

"P1" for the input at 49, to represent the pixel values of a first picture;

"P2" for the input at 50, to represent the pixel values of a second picture;

"S1" for the input at 47, which is a first stencil signal;

"S2" for input at 48, which is a second stencil signal;

"K(blend)" for the output of multiplier 32, which uses the signals labelled S1 and S2 to derive and output the control signal K, which in this mode (picture blend mode), is labelled K(blend); and "Pn" for the output of adder 38, which is combined pixel values derived by combining the pixel values P1 and P2 in multiplier 35 and adder 38 in accordance with the control signal K(blend).

Figure 3:
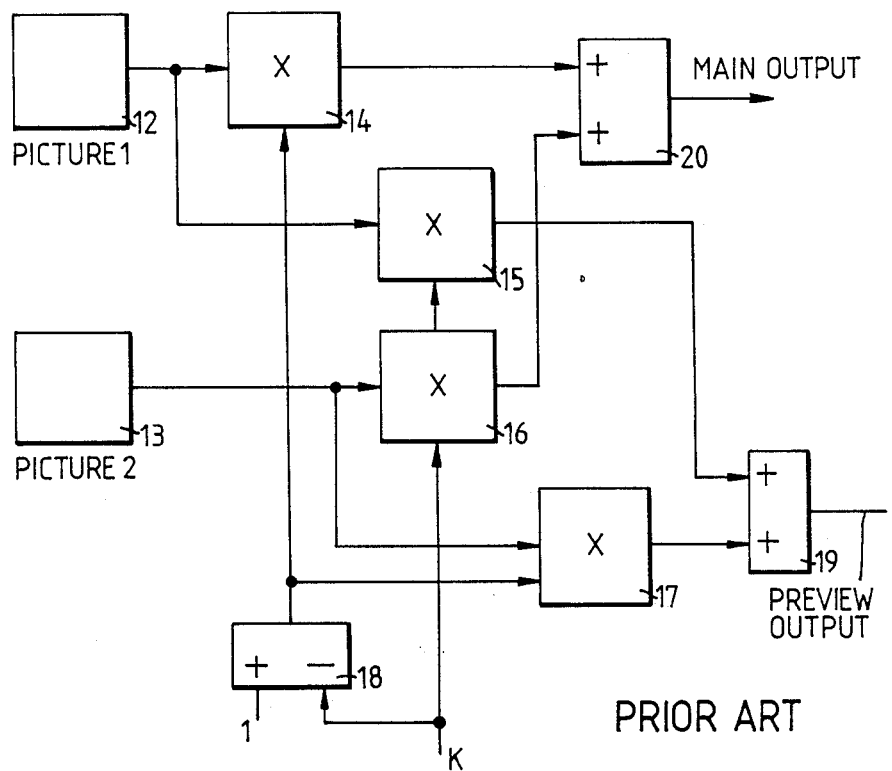
FIG. 3 shows a prior art processor from a still store system.
Figure 4:
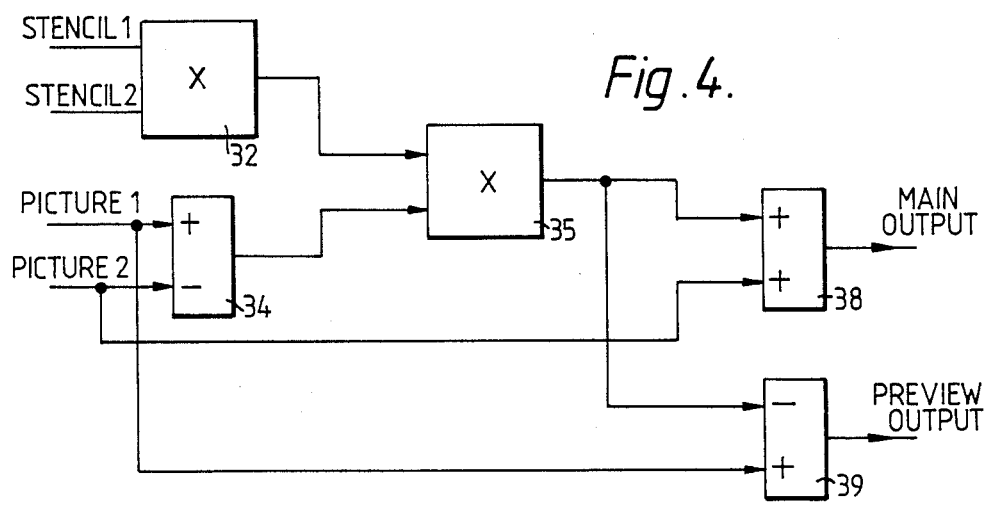
FIG. 4 shows one embodiment of the invention.

The operation of the apparatus in FIG. 5 when switched to third mode corresponds to that in FIG. 4. Considering FIG. 4, in order to provide the fade or cut from one image to the other in the output, two stencil signals are multiplied together in multiplier 32 to give the control signal K. These stencil signals are calculated to give the desired effect. Video signals representing two images are input from two framestores to subtractor 34 the output of which is applied to multiplier 35. The output of multiplier 35, which is K(P1−P2), is provided as an input to adder 38 which also receives the signals from the second picture source giving an output of KP1+(1−K)P2. Subtractor 39 receives an input of K(P1−P2) but subtracts this from P1 to give the preview output of KP2 +(1−K)P1. It can be seen that this circuit gives the same outputs as the circuit in FIG. 3 but using fewer multipliers which gives a saving in cost.

When the circuit of FIG. 5 operates to provide the fade or cut from one image to another, i.e., in a cut-and-fade mode, the following labels can be used:

"P1" for the input at 49, to represent the pixel values of a first picture;

"P2" for the input at 50, to represent the pixel values of a second picture;

"S1" for the input at 47, which is a first stencil signal;

"S2" for the input at 48, which is a second stencil signal;

"K(cut)" for the output of multiplier 32, which uses the signals labelled S1 and S2 to derive and output the control signal K, which in this mode (cut-and-fade mode), is labelled K(cut). The same control signal (cut) can be labelled a "cut-and-fade control signal";

"Pm" for the output of adder 38, which is combined pixel values for a main picture Pm derived by combining the pixel values P1 and P2 in multiplier 35 in accordance with the control signal K(cut) and adding the multiplication result to the pixel values P2, as delayed by delay 36, in adder 38; and "Pp" for the output of subtractor 39, which is combined pixel values for a preview picture Pp derived by combining the pixel values P1 and P2 in multiplier 35 in accordance with the control signal K(cut) and subtracting the multiplication result from the pixel values P1, as delayed by delay 37, in subtractor 39.

To achieve this mode of operation using the FIG. 5 arrangement signals from the control 31 input selector 30 select the correct stencil signals and signals from two luminance stores. Switch 41 is switched to its second position thus connecting the adder/subtractor 39 to the top 8 bit output of multiplier 35 and switch 42 is in its open position to disconnect 38 from 39. In this mode component 39 is forced to act as a subtractor and receives as a second input luminance information from the first picture source. It will be obvious that this configuration is equivalent to that in FIG. 4. The output selector provides the main output on the luminance 1 path and the preview output on the luminance 2 path and these can be delayed separately, at 43 and 52 respectively.

Although described only in terms of luminance signals this system may be made to handle chrominance signals by simply replacing the luminance inputs by chrominance signals.

It is to be understood that by providing different inputs and output signals the processing system of the invention is not limited to the application discussed above.

I claim:

1. A video processing system comprising:
  (a) at least two sources of video signals representing different pictures;
  (b) a source of brush shape signals representing brush shape;
  (c) a video graphic means including a stylus device for producing pressure signals relating to pressure applied to said stylus;
  (d) a source of video graphic signals for points on a picture designated by sid stylus device;
  (e) a source of stencil signals;
  (f) framestore means having a writing input and a reading output;
  (g) a processing circuit having respective first and second video inputs for first and second video signals $L_1$ and $L_2$ and a control input for a control signal K and arranged to produce output signals representing $K L_1+(1-K) L_2$;
  (h) selector means for conditioning the system to operate selectively in any one of a plurality of different modes including:
    (1) a first mode in which said source of video graphic signals is connected to the first video input of said processing circuit to provide said first video signal $L_1$, said output of said framestore means is connected to the second video input of said processing circuit to provide said second video signal $L_2$, the output of said processing circuit is written into said framestore means, and a control signal K derived from said pressure signals and said brush shape signals is applied to said control input of said processing circuit, and (2) a second mode in which said two sources of video signals are connected to said two video inputs of said processing circuit to provide said first and second video signals $L_1$ and $L_2$ respectively, said control input of said processing circuit is connected to said source of stencil signals to provide said control signal K, and the output of said processing circuit is written into said framestore means.

2. A system as in claim 1 wherein said source of stencil signals comprises a source of first and second stencil signals, and including a multiplier for multiplying said first and second stencil signals to thereby provide said control signal K when the system is operating in said second mode.

3. A system as in claim 1 further including a display for the output signals of the processing circuit.

4. A video processing system as in claim 1 wherein said processing circuit is arranged to produce second output signals, which represent $KL_2+(1-K)L_1$ and are in addition to said output signals representing $KL_1+(1-K)L_2$.

5. A system as in claim 4 further comprising a respective display for each of said output signals of said processing circuit which represent $KL_2+(1-K)L_1$ and represent $KL_1+(1-K)L_2$.

6. A video processing system comprising:
video input means for video signals from a plurality of sources of video signals;
control input means for a plurality of control signals;
video selector means for selecting video signals from more than one of said plurality of sources of video signals to thereby provide at least two selected video signals;
control selector means for selecting one or more of said plurality of control signals to thereby provide selected control signals;
combining means for combining said selected control signals to produce a combined control signal;
processing means for combining the selected video signals in proportions determined by said combined control signal, said processing means being capable of operating in more than one mode, including a first mode producing a single video output which is the combination of at elast two of said selected video signals and a second mode producing first and second video outputs, wherein in said second mode two selected video signals are combined in one proportion to produce the first video output and in the opposite proportion to produce the second video output; and
means for selecting said first mode or said second mode of operation of the processing means.

7. A system as in claim 6 further comprising:
means including a touch tablet and stylus for designating points on a graphic image;
means included in said video input means for providing video signals to be applied to said points;
input means for brush signals representing a graphic parameter to be used to create designated points on the graphic image;
means for providing a signal representing the pressure on the stylus;
framestore means for storing signals representing the graphic image;
wherein said video selector means selects as first selected video signals said video signals to be applied to said points and as second selected video signals said signals stored in said framestore means for said designated points, and said control selector means selects as said control signals said brush signals and said pressure signals; and
wherein said processing means in the first mode produces said single video output from the signals representing the graphic image which are stored in the framestore means.

8. A system as in claim 6 wherein:
said video selector means selects as first selected video signals a set of video signals representing a first picture and as second selected video signals a set of video signals representing a second picture, said control selector means selects as a first control signal first stencil signals associated with said first picture and as a second control signal second stencil signals associated with said second picture, and said processing means operates in the first mode to produce as said single video output signals representing an image composed of the two pictures.

9. A system as in claim 6, wherein said processing means comprises in the first mode:
means for producing the difference between the two selected video signals;
means for multiplying said difference by the combined control signal; and
means for adding the control signal multiplied by said difference to one of said selected video signals.

10. A system as in claim 6 wherein said processing means comprises in the second mode:
means for producing the difference between said at least two selected video signals;
a multiplier for multiplying said difference by the combined control signal;
means for producing the sum of the output of the multiplier with one of said two selected video signals to produce one of said first and second video outputs;
means for producing the difference between the output of said multiplier and the other of said two selected video signals to produce the other of said first and second video outputs; and
means for displaying said first and second video outputs.

11. A video processing system comprising:
video input means for video signals representing a plurality of source images;
operator controlled means for producing video signals representing a graphic input;
a source of stencil signals;
a source of control signals representing graphic parameters;
arithmetic processor means having two functional states, wherein in a first one of said states said processor means comprise means functioning to combine video signals from said video input means to produce edited video signals under the control of said stencil signals and in a second one of said states said processor means comprise means functioning to combine video signals from said video input means representing a selected image with said graphic input in response to said control signals to produce graphically modified video signals; and means for selecting the first or the second of said functional states so that the system can be utilized at different times for editing or for graphic production.

12. A system comprising:

a first image input and a second image input for image signals;

at least one control input for control signals;

a framestore for storing information for points of an image;

a processor coupled to said inputs and framestore and a selector coupled to said processor to cause the processor to operate selectively in one of a plurality of modes, wherein (i) in a brush mode the selector conditions the processor to derive from the first image input image signals for new information concerning points of the image in the framestore and to derive from said control input brush control signals pertaining to a control parameter and to combine said new information with information from the framestore for respective points of the same image in accordance with said brush control signals and to store the result of said combining in the framestore and (ii) in a picture combining mode the selector conditions the processor to derive from said image inputs image signals representing a first picture and a second picture and to derive from said control input combining control signals pertaining to how the two pictures should be combined and to combine the two pictures in accordance with said combining control signals to thereby form a composite picture.

13. A system as in claim 12 including an operator controlled tablet and stylus means for supplying to the control input signals related to stylus position on the tablet and pressure on the stylus and means for further supplying to the control input a stencil signal, and wherein the processor includes means operative in said brush mode to derive said brush control signals by combining said stencil signals with the signals related to stylus position and pressure on the stylus.

14. A system as in claim 13 in which said processor is further selectively operable in a cut and fade mode in which the processor derives from said image inputs image signals representing pixel values of a first input picture and of a second input picture and derives from said control input cut-and-fade control signals pertaining to proportions in which respective pixel values of the first and second input pictures should be combined to form combined pictures and combines the values of respective pixels of the first and second input pictures in accordance with said cut-and-fade control signals in one proportion to form a main combined picture and in the opposite proportion to form a preview picture.

15. A system as in claim 12 in which said processor is further selectively operable in a cut and fade mode in which the processor derives from said image inputs image signals representing pixel values of a first input picture and of a second input picture and derives from said control input cut-and-fade control signals pertaining to proportions in which respective pixel values of the first and second input pictures should be combined to form combined pictures and combines the values of respective pixels of the first and second input pictures in accordance with said cut-and-fade control signals in one proportion to form a main combined picture and in the opposite proportion to form a preview picture.

16. A process comprising:

providing a framestore having storage locations for storing pixel values of a picture;

providing a processor selectively operable in a plurality of modes including:

(a) a brush mode in which the processor derives signals designating pixels, a signal P related to the pressure on an operator controlled stylus for the designated pixels, a signal B related to a brush shape and a stencil signal S and derives from said signals P, B and S a combined brush control signal K(brush) for the designated pixels, and the processor further derives from the framestore pixel values Ls stored therein for pixels related to the designated pixels and derives new pixel values Ln for the designated pixels and combines the new and stored pixel values Ln and Ls for the designated pixels in accordance with the brush control signal K(brush) to thereby derive combined pixel values Lc for the designated pixels, and the processor stores the combined pixel values Lc for the respective designated pixels in the framestore for use as the stored pixel values Ls for the respective pixels in any further combining of new and stored information for pixels which are again designated or for display of a picture derived on the basis of the pixel values Lc; and (b) a picture blend mode in which the processor derives pixel values for the pixels of a picture P1 and of a picture P2 and a blend control signal K(blend) for the respective pixel values of a new picture Pn and combines the pixel values of the pixels of pictures P1 and P2 in accordance with the blend control signal K(blend) for respective pixels of said pictures P1 and P2 to derive combined pixel values Pn for the new picture for storage or display thereof; and storing or displaying at least one of the pictures derived on the basis of the pixel values Lc and the picture Pn.

17. A process as in claim 16 in which the processor is further operable in a cut-and-fade mode in which the processor derives pixel values for the pixels of an input picture P1 and of an input picture P2, derives a cut control signal K(cut) for respective pixels of input pictures P1 and P2 and combines the pixel values of respective pixels of input pictures P1 and P2 in accordance with the cut control signal K(cut) for said respective pixels in one proportion to derive new combined pixel value information for a new main picture Pm and in another proportion to derive combined pixel values for a new preview picture Pp, and storing or displaying at least one of the pictures Pm and Pp.

18. A process as in claim 17 in which in said cut-and-fade mode said proportion for said picture Pm is the opposite of that for said picture Pp.

19. A process as in claim 17 in which in the brush mode the processor derives said combined pixel values Lc for one of said designated pixels from the brush control signal K(brush) and the new pixel values Ln and the stored pixel values Ls for the designated pixel on the basis of the relationship Lc=K(Ln)+(1−K)(Ls), in which relationship K stands for K(brush).

20. A process as in claim 19 in which in the picture blend mode the processor derives combined pixel values Pn for a pixel of a new picture from the blend control signal K(blend) and the pixel values for respective pixels of the pictures P1 and P2 on the basis of the relationship $Pn=K(P1)+(1-K)(P2)$, in which relationship K stands for K(blend).

21. A process as in claim 20 in which in the cut-and-fade mode the processor derives combined pixel values Pm for a pixel of the main picture from the control signal K and the pixel values for respective pixels of the input pictures P1 and P2 on the basis of the relationship $Pm=K(P1)+(1-K)(P2)$, in which relationship K stands for K(cut), and derives said new combined pixel values Pp for a corresponding pixel of the preview picture from the control signal K and the pixel values for respective pixels of the pictures P1 and P2 on the basis of the relationship $Pp=K(P2)+(1-K)(P1)$, in which relationship K stands for K(cut).

* * * * *